United States Patent [19]

Monkovic et al.

[11] 3,910,919

[45] Oct. 7, 1975

[54] NEW SYNTHESIS FOR THE PREPARATION OF 3-HYDROXY-N-ALKYLISOMORPHINANS

[75] Inventors: Ivo Monkovic; Henry Wong, both of Candiac, Canada

[73] Assignee: Bristol-Myers Company, New York, N.Y.

[22] Filed: Nov. 7, 1973

[21] Appl. No.: 413,463

Related U.S. Application Data

[62] Division of Ser. No. 229,201, Feb. 24, 1972, Pat. No. 3,803,150.

[52] U.S. Cl. ........ 260/285; 260/283 SY; 260/558 P
[51] Int. Cl.² ........................................ C07D 221/38
[58] Field of Search .................................... 260/285

[56] References Cited
UNITED STATES PATENTS
2,766,245   10/1956   Gates ............................... 260/285

OTHER PUBLICATIONS

Bien et al., Chemical Abstracts, Vol. 58, 10165 f (1963).

*Primary Examiner*—Donald G. Daus
*Assistant Examiner*—Diana G. Rivers
*Attorney, Agent, or Firm*—Robert E. Havranek

[57]           ABSTRACT

3-Hydroxy-N-alkylisomorphinans are compounds known to possess valuable properties as narcotic analgetics and/or antagonists. The commercial use of these compounds has not been practical due to the high cost of making these compounds. A new synthesis has been found which provides the compounds in commercial yields via a total synthesis.

4 Claims, No Drawings

NEW SYNTHESIS FOR THE PREPARATION OF 3-HYDROXY-N-ALKYLISOMORPHINANS

CROSS-REFERENCE TO RELATED APPLICATIONS

This application is a divisional application of copending application Ser. No. 229,201, filed Feb. 24, 1972 now U.S. Pat. No. 3,803,150.

BACKGROUND OF THE INVENTION

1. Field of the Invention

This invention embodies a new process for the preparation of compounds useful as analgetics and/or narcotic antagonists from materials other than opium alkaloids.

2. Description of the Prior Art

A. U.S. Pat. No. 3,285,922 reports morphinans and isomorphinans having the formula

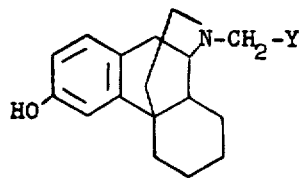

in which Y is cyclobutyl or cyclopropyl as possessing analgetic and/or narcotic antagonist activity.

B. M. Gates and T. Montzka [J. Med. Chem., 7, 127 (1964)] report the synthesis of morphinans and isomorphinans of the formula

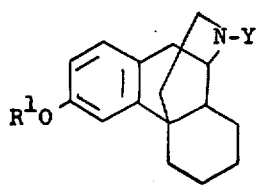

in which Y is cyclopropylmethyl, cyclobutylmethyl, 1-phenylcyclopropylmethyl, methyl, cyano, H, etc. and $R^1$ is methyl or H.

C. M. Gates and W. Webb, [J. Am. Chem. Soc., 80, 1186 (1958)] also report similar compounds the most pertinent of which appears to be that having the formula

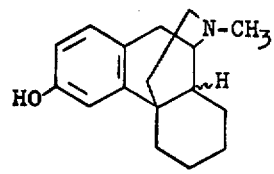

SUMMARY OF THE INVENTION

Isomorphinan compounds having the formula

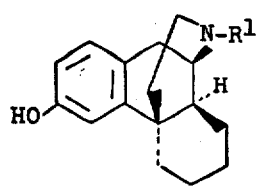

XII wherein $R^1$ is (lower)alkyl,

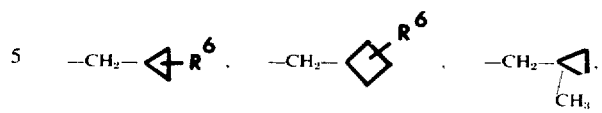

$-(CH_2)_n-C_6H_5$ in which $R^6$ is H or $CH_3$ and $n$ is an integer of 1 to 3; or a pharmaceutically acceptable acid addition salt thereof are prepared by the consecutive steps of A. *acylating* the compound having the formula

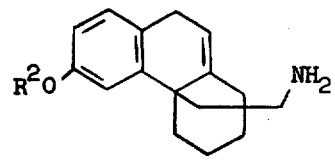

V in which $R^2$ is (lower)alkyl to produce a compound having the formula

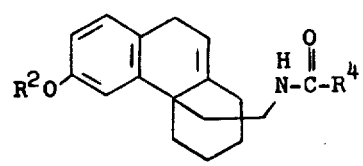

VII in which $R^2$ is as above, $R^4$ is (lower)alkyl, $-(CH_2)_n-C_6H_5$,

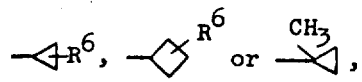

in which $R^6$ is H or $CH_3$ and $n$ is an integer of 0 to 2;

B. *hydrating* compound VII by treatment with boron trihydride and then with hydrogen peroxide in the presence of base to produce the compound having the formula

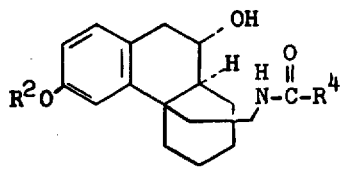

VIII in which $R^2$ and $R^4$ are as above;

C. *esterifying* compound VIII with methylsulfonyl chloride to produce the compound having the formula

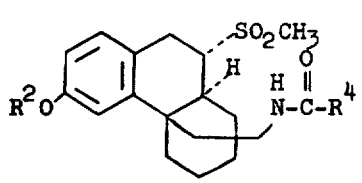

IX in which $R^2$ and $R^4$ are as above;

D. *cyclizing* compound IX by treatment with sodium hydride to produce a compound having the formula

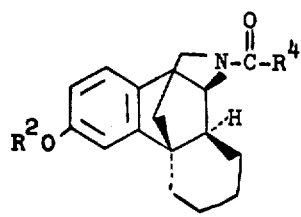

X in which R² and R¹ are as above.

E. *reducing* compound X wherein R² is (lower)alkyl and R⁴ is C₁–C₉ (lower)alkyl,

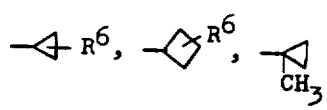

or —(CH₂)ₙ—C₆H₅, in which R⁶ is H or (lower)alkyl and n is an integer of 1 to 2 with lithium aluminum hydride to produce the compound having the formula

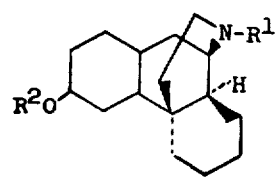

XIp in which R² is (lower)alkyl and R¹ is C₂–C₁₀ (lower)alkyl,

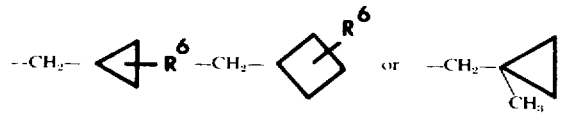

in which R⁶ is H or CH₃ and n is an integer of 1 to 3; and

F. *cleaving* the ether function of compound XIp to produce compound XIIp wherein R² is H.

Compounds having the formula

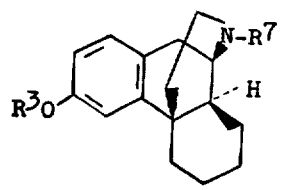

in which R³ is H or methyl and R⁷ is cyclopropylmethyl or cyclobutylmethyl are reported in U.S. Pat. No. 3,285,922 to possess valuable analgetic and/or narcotic antagonist activity.

Unfortunately these compounds are not available commercially due to their high cost of synthesis. These compounds, when prepared by the process of the Gates patent, are derived from opium alkaloids; expensive starting materials. In addition, the yields are low and thereby uneconomical.

Drug abuse by thrill-seeking youth or by people looking for an escape from the realities of every day life has become more and more common place in our present society. One class of widely abused drugs are the narcotic analgetics such as codeine, morphine, meperidine, etc. It is because of the high addictive potential of these agents that much time and money are being expended by the pharmaceutical industry and by governments to try and discover and develop new nonaddicting analgetics and/or narcotic antagonists. The compounds of formula XII appear to possess some of these desirable properties.

It was therefore an object of the present invention to discover a new and economical method of preparing these compounds.

It was a further object to develop a method employing starting materials that were not opium alkaloids or derivatives thereof.

The objectives of the present invention have been achieved by the provision of the process for the total synthesis of compounds having the formula

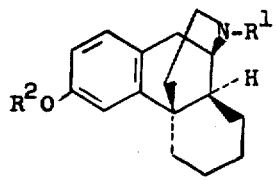

XII in which R² is H or (lower)alkyl and R¹ is selected from the group comprising (lower)alkyl,

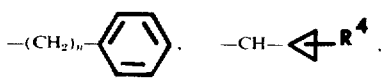

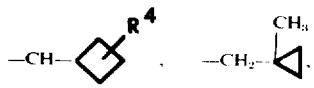

in which R⁴ is H or CH₃ and n is 1 to 3; from the readily available starting material 7-methoxy-3,4-dihydro-1[2H]-naphthalenone.

The compounds of the instant invention have the basic morphinan nucleus numbered and represented by the following plane formula

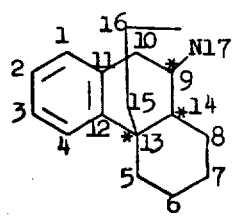

Although there are three asymetric carbons (asterisks) in the morphinan molecule, only two diastereoisomeric (racemic) forms are possible, because the iminoethano system, attached to position 9 and 13, is geometrically constrained to a cis-(1,3-diaxial)-fusion. These racemates can therefore differ only at the junction of rings B and C—in other words, in the configuration of carbon 14. The only variable will be the cis and trans relationship between the 5 (13) and 8 (14) bonds

[Analgetics, Ed. George de Stevens, Academic Press, New York, p. 137 (1965)].

The compounds of the present invention have the 5 (13) and 8 (14) bonds trans to each other and are commonly designated as "isomorphinans". For the purpose of this application, the use of a graphic representation of an isomorphinan is meant to include the dl racemic mixture and the resolved d and l isomers thereof.

The isomorphinan compounds of the present invention can each exist as two optical isomers, the levorotatory and dextrorotatory isomers. The optical isomers can be graphically illustrated as:

ISOMORPHINANS

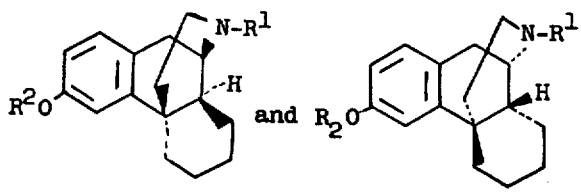

The present invention embodies all of the isomorphinan isomers including the optical isomers in their resolved form.

The optical isomers can be separated and isolated by fractional crystallization of the diastereoisomeric salts formed, for instance, with d- or l-tartaric acid or D-(+)-α-bromocamphorsulfonic acid.

For the purpose of this disclosure, the term "(lower)alkyl" is defined as an alkyl radical containing 1 to 10 carbon atoms in straight or branched chains. The terms "(lower)alkynyl and (lower)alkenyl" are hydrocarbons of 2–10 carbons with 1 triple bond and 2–10 carbons with 1 double bond respectively. "(Lower)alkanol" is a straight or branched chain alcohol of 1 to 10 carbon atoms.

For the purpose of this disclosure, the term "acid addition salt" is defined to include all those inorganic and organic acid salts of the compounds of the instant invention, which salts are commonly used to produce nontoxic salts of medicinal agents containing amine functions. Illustrative examples would be those salts formed by mixing the compounds of formula I with hydrochloric, sulfuric, nitric, phosphoric, phosphorous, hydrobromic, maleic, malic, ascorbic, citric or tartaric acid, and the like.

The compounds of the instant invention are prepared by a total synthesis comprising up to 10 steps. Surprisingly, the synthesis is efficient and appears commercially feasible. The process is outlined in Charts I, II and III.

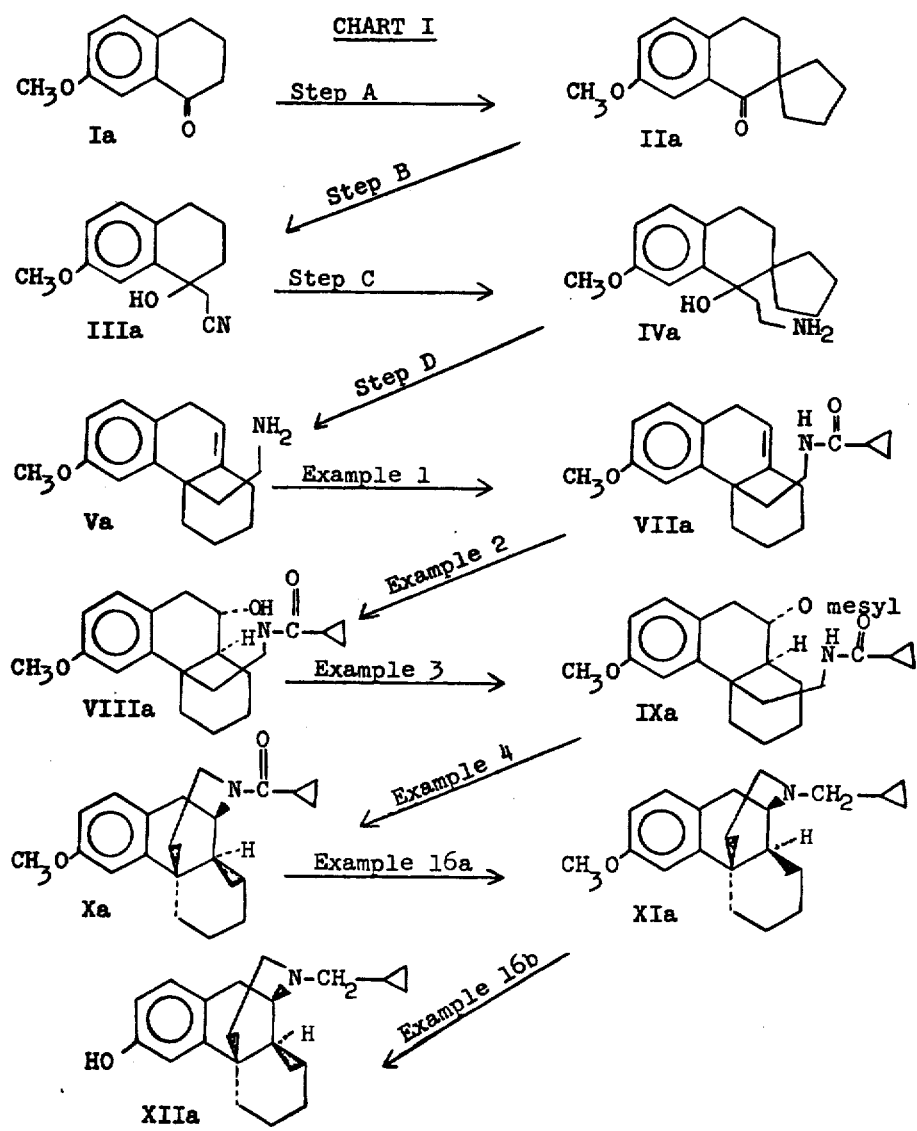

CHART I

CHART II
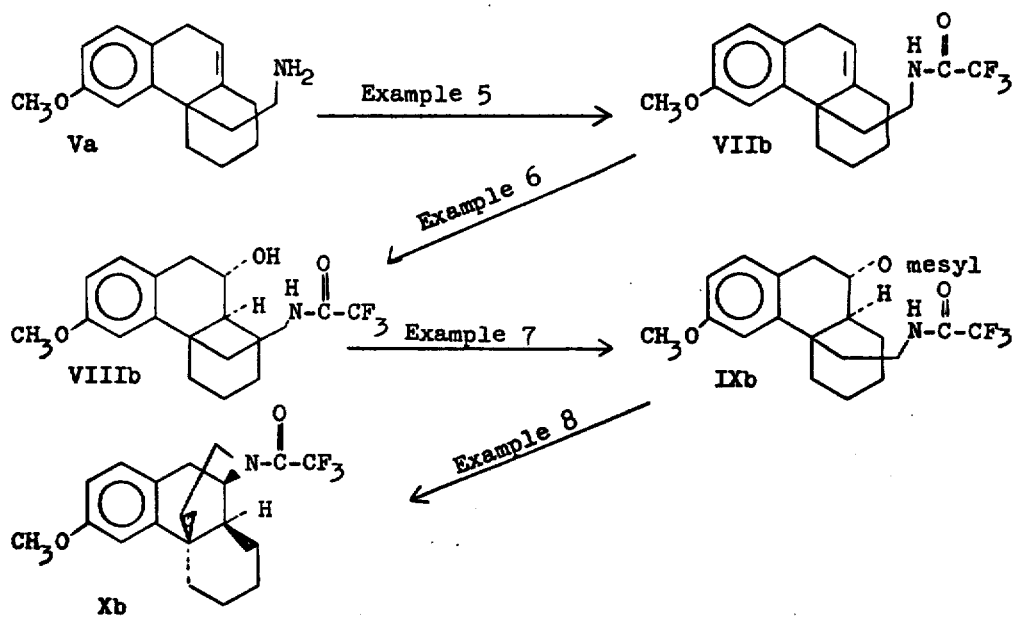
and
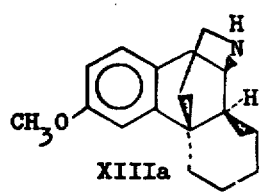
CHART III
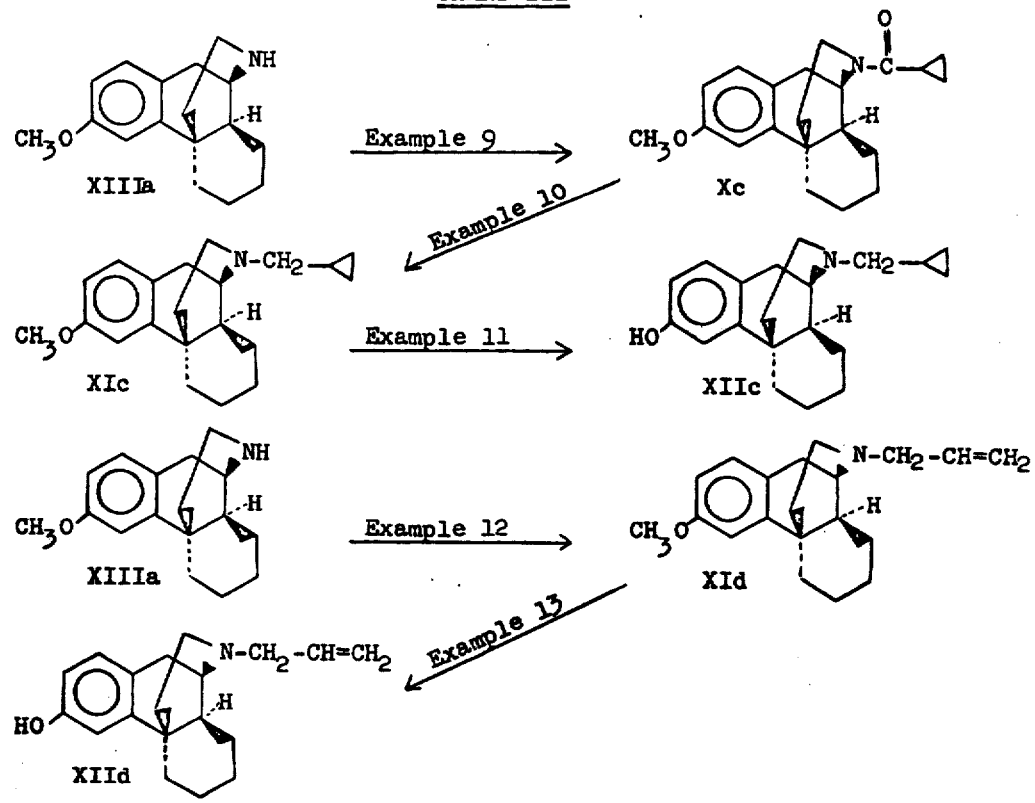

CHART 3 —Continued

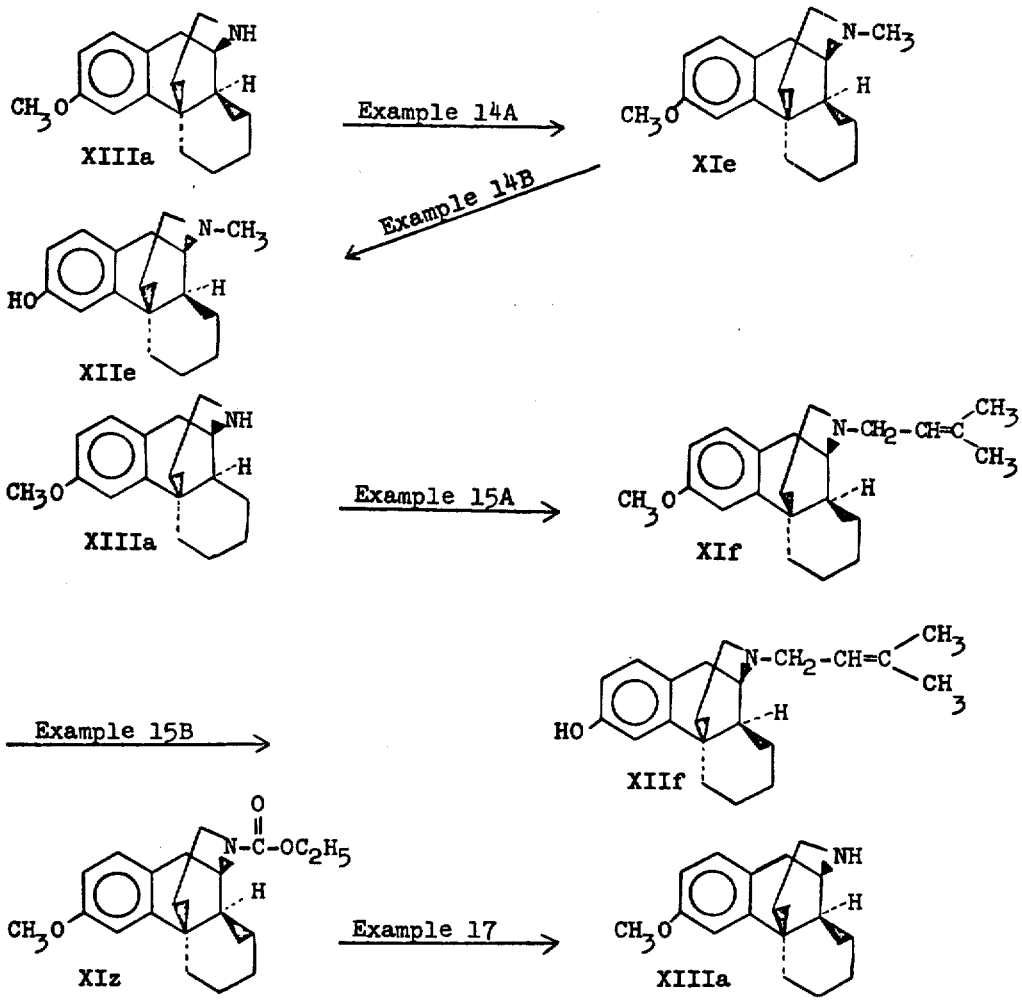

A preferred embodiment of the present invention is the process of preparing compounds having the formula

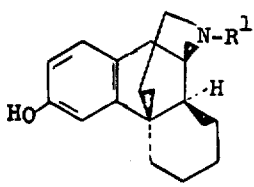

XIIp wherein R¹ is $C_2-C_{10}$ (lower)alkyl, $-(CH_2)_n-C_6H_5$,

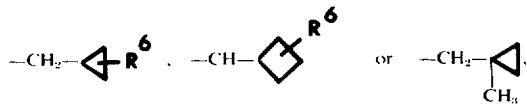

in which R⁶ is H or $CH_3$ and $n$ is an integer of 1 to 3; which process comprises the consecutive steps of A. *acylating* 1 mole of the compound having the formula

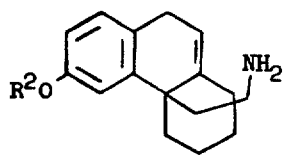

V with at least one mole of an acylating agent having the formula

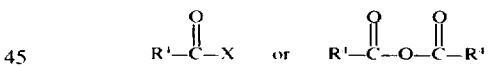

in which X is OH, Cl, Br or I, R⁴ is (lower)alkyl, $-(CH_2)_n-C_6H_5$, n

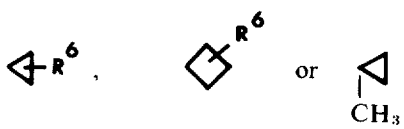

in which R⁶ is H or $CH_3$ and $n$ is an integer of 1 or 2, or a functional equivalent thereof for the acylation of a primary amine, in an inert organic solvent, in the presence of at least one mole of a tertiary amine to produce the compound having the formula

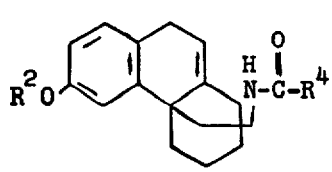

VIIp in which R⁴ and R² are as above;

B. *treating* 1 mole of compound VIIp with at least two mole of boron trihydride, in an anhydrous organic solvent, and subsequently with at least one mole of hydrogen peroxide and water in the presence of an alkali metal hydroxide to produce the compound having the formula

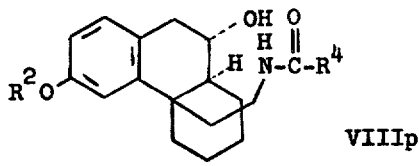

VIIIp in which $R^2$ and $R^4$ are as above;

C. *esterifying* 1 mole of compound VIIIp with at least one mole of a (lower)alkyl, benzene or toluene sulfonyl, halide; or its equivalent, in the presence of at least one mole of a tertiary amine in an inert organic solvent, to produce the compound having the formula

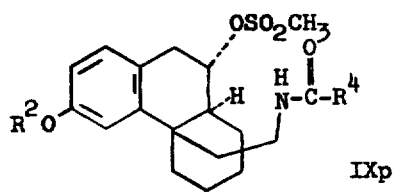

IXp in which $R^2$ and $R^4$ are as above;

D. cyclizing 1 mole of compound IXp by treatment with at least one mole of sodium hydride, in an inert organic solvent, to produce the compound having the formula

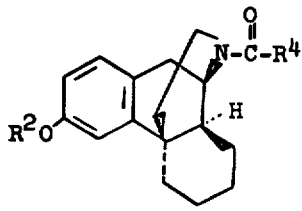

in which $R^2$ and $R^4$ are as above;

E. reducing one mole of compound X with an excess of lithium aluminum hydride in an inert solvent with the aid of heat to produce the compound having the formula

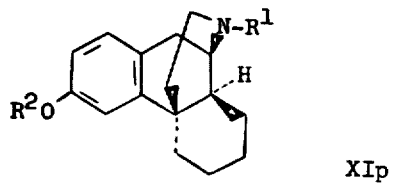

XIp in which $R^2$ and $R^1$ are as above; and

F. *cleaving* the ether function of compound XIp to produce the compound of formula XIIp.

Another preferred embodiment is the process for the preparation of compound XIIp wherein in step A 1 mole of compound V is acylated with about 1 to about 1.5 moles of acylating agent, in an organic solvent selected from the group comprising methylene chloride, benzene, xylene, ether, dichloroethane or chloroform, in the presence of at least one mole of a tertiary amine selected from the group comprising triethylamine, trimethylamine, pyridine, N-methylpiperidine or N-methylpyrrolidine, to produce compound VIIp; in step B one mole of compound VIIp is treated with about 1.5 to about 4 moles of boron trihydride, in an anhydrous organic solvent selected from the group comprising dry tetrahydrofuran, benzene, dioxane, diethyl ether, dipropylethyl or dibutyl ether, for about 2 to 24 hours, at a temperature in the range of about 0° C. to about 30° C., following which the mixture is treated with at least an equimolar quantity each of hydrogen peroxide, water and an alkali metal hydroxide with the aid of heat to produce the compound having the formula VIIIp; in step C esterifying one mole of compound VIIIp with about 1.0 to 2.0 moles of a (lower)alkyl sulfonyl chloride, in the presence of about 1.0 to 3.0 moles of a tertiary amine selected from the group comprising triethylamine, trimethylamine, pyridine, N-methylpiperidine or N-methylpyrrolidine, in an organic solvent selected from the group comprising benzene, xylene, toluene, methylene chloride or dichloroethane, to produce compound IXp; in step D cyclizing one mole of compound IXp by treatment with about 1.0 to about 2.0 moles of sodium hydride in an organic solvent selected from the group comprising dimethylformamide, dimethylacetamide, benzene, toluene, xylene, tetrahydrofuran, dioxane, at about room temperature for a period of about 5 to about 25 hours, to produce compound Xp; in step E reducing one mole of compound Xp with about 1.0 to about 2.0 moles of lithium aluminum hydride in an organic solvent selected from the group comprising tetrahydrofuran, dioxane, diethyl ether, dipropyl ether or dibutyl ether, with the aid of heat, to produce compound XIp; and in step F cleaving the ether function of 1 mole of compound XIp by treatment with an agent selected from the group comprising hydrobromic acid, boron tribromide or pyridine hydrochloride to produce compound XIIp.

A more preferred embodiment is the process for the preparation of compound XIIp wherein in step A one mole of compound V in which $R^2$ is methyl is acylated with about 1.0 to about 1.2 moles of acylating agent having the formula

in which X is Cl, Br or I and $R^4$ is (lower)alkyl, —$(CH_2)_n$—$C_6H_5$,

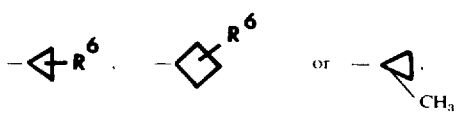

in which $R^6$ is H or $CH_3$ and $n$ is an integer of 1 or 2, in methylene chloride or dichloroethane, in the presence of about 1 to about 2 moles of triethylamine or pyridine to produce compound VIIp, in step B treating one mole of compound VIIp with about 2 to about 3 moles of boron trihydride in tetrahydrofuran or dioxane, and 1 to 2 moles each of hydrogen peroxide, water and sodium or potassium hydroxide to produce compound VIIIp; in step C esterifying one mole of compound VIIIp with about 1.1 to about 1.6 moles of methylsulfonyl chloride, in the presence of about 1.1 to about 1.6 moles of triethylamine or pyridine in benzene, toluene or xylene to produce compound IXp; in step D cyclizing one mole of compound IXp with about 1.3 to 1.7 moles of sodium hydride in dimethylformamide or dimethylacetamide to produce compound Xp; in step E reducing one mole of compound Xp with about 1.0 to about 1.5 moles of lithium aluminum hydride in anhydrous tetrahydrofuran or dioxane at about reflux temperatures to produce compound XIp; and in step F cleaving the ether function of XIp by treatment with about 1.5 to about 4.0 moles of boron tribromide, hydrobromic acid or pyridine hydrochloride to produce compound XIIp.

A most preferred embodiment is the process for the preparation of compound XIIp in which $R^1$ is

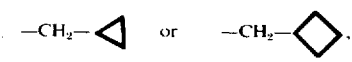

wherein in step A one mole of compound V in which $R^2$ is methyl is acylated with about 1.0 to about 1.2 moles of cyclobutylcarbonyl chloride or cyclopropyl carbonyl chloride in methylene chloride, in the presence of 1.0 to 1.3 moles of triethylamine to produce compound VIIp; in step B treating one mole of compound VIIp with about 2 to 3 moles of boron trihydride in tetrahydrofuran, followed by 1.0 to 1.3 moles each of hydrogen peroxide, water and sodium hydroxide with the aid of heat to produce compound VIIIp; in step C esterifying one mole of compound VIIIp with about 1.1 to 1.3 moles of methylfulfonyl chloride, in the presence of 1.1 to 1.3 moles of triethylamine in anhydrous benzene to produce compound IXp; in step D cyclizing one mole of compound IXp with about 1.4 to 1.6 moles of sodium hydride in dimethylformamide to produce compound Xp; in step E reducing one mole of compound Xp with about 1.0 to 1.5 moles of lithium aluminum hydride in anhydrous tetrahydrofuran to produce compound XIp; and in step F cleaving the ether function of XIp by treatment with about 1.5 to 2.5 moles of boron tribromide to produce compound XIIp.

For the purpose of this disclosure the term "inert organic solvent" means an organic solvent that does not participate in the reaction to the extent that it emerges unchanged from the reaction. Such solvents are methylene, chloride, chloroform, dichloroethane, tetrachloromethane, benzene, toluene ether, ethyl acetate, xylene, tetrahydrofuran, dioxane, dimethylacetamide, dimethylformamide, and the like when an acid halide is employed. When an alkylation reaction is being performed, the inert solvent used may also include (lower-)alkanols such as methanol, ethanol, n-propanol, isopropanol and the like. The term "organic tertiary amine" means a tertiary amine commonly employed as a proton acceptor in alkylation and acylation reactions. Such amines are tri(lower)alkylamines, e.g., trimethylamine, triethylamine, and the like, pyridine, dimethylaniline, N-methylpiperidine, and the like.

PREPARATION OF THE STARTING MATERIALS

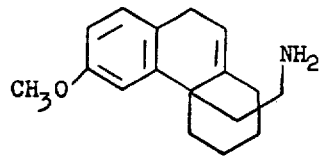

XIIIa

4α-(2-Aminoethyl)-1,2,3,4,4a,9-hexahydro-6-methoxyphenanthrene

Step A

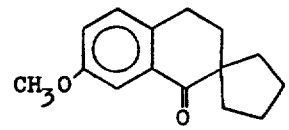

3,4-Dihydro-7-methoxy-2,2-tetramethylene-1-(2H)-naphthalenone (IIa)

A nitrogen atmosphere was maintained throughout the following reaction. To a stirred and refluxing suspension of 12 g. (0.5 mole) of sodium hydride in 100 ml. of dry benzene was added during 30 minutes, 16.6 g. (0.2 mole) of anhydrous t-amyl alcohol. The reaction mixture was stirred and refluxed during 15 minutes, and then a solution of 35.2 g. (0.2 mole) of 7-methoxy-3,4-dihydro-1(2H)-naphthalenone (Ia) in 100 ml. of dry benzene was added dropwise. After another 15 minutes, 54.0 g. (0.25 mole) of 1,4-dibromobutane were added over a period of 15 minutes followed by 100 ml. of dry benzene. The resulting reaction mixture was stirred and refluxed during 50 hours. It was then cooled, washed twice with water, dried over anhydrous sodium sulfate and concentrated at reduced pressure. The residual yellow oil was dissolved in 400 ml. of petroleum ether (b.p. 30°–60° C.), treated with charcoal, filtered and the solvent evaporated. The resulting clear light yellow oil (45.7 g.) was distilled at reduced pressure and the fraction boiling at 120°–123° C./0.05 mm. was collected. This procedure yielded 29.4 g. (65%) of colorless spiro ketone IIa. The infrared (IR) and nuclear magnetic resonance (NMR) spectra were consistent with the structure.

Anal. calc'd. for $C_{15}H_{18}O_2$: C, 78.22; H, 7.88. Found: C, 77.96; H, 7.93.

Step B

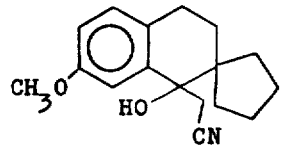

1-Hydroxy-7-methoxy-1,2,3,4-tetrahydro-2,2-tetramethylene-1-naphthaleneacetonitrile (IIIa)

To a stirred solution of 13.8 ml. (0.022 mole) of 1.6 M n-butyl lithium in hexane at -80° C. under nitrogen was rapidly added 13.8 ml. of anhydrous tetrahydrofuran (THF) followed immediately by a solution of 0.82 g. (0.02 mole) of acetonitrile in 20 ml. THF which was added during 7 minutes. After stirring for 1 hour at -80° C., the resulting white suspension was treated during 5 minutes with a solution of 4.60 g. (0.02 mole) of the spiroketone IIa in 20 ml. THF. The cold bath was removed and the solution was stirred for 10 minutes before it was poured into ice-water acidified with hydrochloric acid. The layers were separated, and the aqueous layer was extracted with three 25 ml. portions of benzene.

After drying over anhydrous sodium sulfate, evaporation of the solvent and recrystallization of the remaining solid from chloroform, there was obtained 4.4 g. (80%) of white solid IIIa, m.p. 140°–142° C. The IR and NMR spectra were consistent with the structure.

Anal. calc'd. for C₁₇H₂₁NO₂: C, 75.24; H, 7.80; N, 5.16.
Found: C, 75.12; H, 7.91; N, 4.89.

Step C

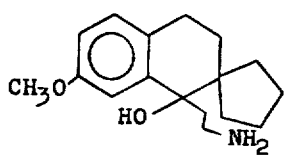

1-(2-Aminoethyl)-7-methoxy-1,2,3,4-tetrahydro-2,2-tetramethylene-1-naphthol (IVa)

To a stirred suspension of 0.57 g. (0.015 mole) of lithium aluminum hydride in 20 ml. anhydrous tetrahydrofuran (THF) under N₂ was added a solution of 2.71 g. (0.01 mole) of IIIa in 20 ml. tetrahydrofuran. The reaction mixture was stirred for 4 hours at room temperature (r.t.). It was then cooled and treated with 0.6 ml. of water. The inorganic material was filtered off and washed well with ether. The filtrate was extracted with two portions of 15 ml. of 1N hydrochloric acid. The extract was basified with aqueous ammonia, and the free base was taken up in ether. After drying over anhydrous sodium sulfate and evaporation of the solvent, there was obtained 2.2 g. of slightly yellow oil IVa. It was converted to the oxalate salt in acetone and recrystallized from methanol. This procedure yielded 2.9 g. (76%) of white solid, containing 1 mole of methanol of crystallization; m.p. 178°–180° C.

In another experiment IVa was obtained from IIa without isolation of IIIa as follows:

4.6 g. (0.02 mole) of the spiroketone IIa in 20 ml. of tetrahydrofuran was converted to the nitrile IIIa according to the procedure described on the preceding page. To the resulting cold solution (-80° C.) of IIIa, was added 1.14 g. (0.03 mole) of lithium aluminum hydride in small portions. After the addition had been completed, the reaction mixture was stirred at r.t. for 4 hours. After work up as above, there was obtained 5.7 g. (75% overall) of the oxalate salt of IVa, m.p. 179°–180° C. In both procedures, the IR and NMR spectra were consistent with the desired product.

Anal. calc'd. for C₁₇H₂₅NO₂.C₂H₂O₄.CH₃OH: C, 63.31; H, 7.70; N, 3.69.

Method A

Compound IVa [1.50 g. (0.00548)] (free base liberated from 2 g. of oxalate salt) in 5 ml. of ether was treated with 1.5 ml. of concentrated HCl under N₂ at 55°–60° C. for 5 hours. To the cooled mixture were added in succession 10 ml. of ether and 10 ml. of water. After shaking, the two layers were separated. The acidic layer was made alkaline with aqueous ammonia and extracted with ether. The ether layer was dried (K₂CO₃) and concentrated to yield 1.30 g. of pale yellow oil Va. It was converted to an oxalate salt in acetone. The crystals were filtered and washed with a small amount of methylene chloride. The IR and NMR spectra were consistent with the structure.

Yield 1.7 g. (96%) of white solid, m.p. 187°–189° C.
Anal. calc'd. for C₁₇H₂₃NO.C₂H₂O₄: C, 65.69; H, 7.25; N, 4.03.
Found: C, 65.46; H, 7.20; N, 3.85.

Method B 120 g. of the oxalate salt of IVa was slurried in 700 ml. of water, and to it was added 400 ml. of benzene and 60 ml. of concentrated ammonia. The mixture was stirred until all the solid had disappeared (ca. 15 minutes) and then the layers were separated. The water layer was extracted with another 100 ml. of benzene, and the combined benzene layers were shaken with 200 ml. of saturated NaCl solution, filtered over K₂CO₃ and concentrated in vacuo. The residual oil (ca. 90 g.) was dissolved in 300 ml. of ether in a 1 liter round bottom flask and while cooling with an ice-water bath and swirling, to it was added carefully 90 ml. of concentrated HCl and then gently refluxed on the steambath for three hours in a closed system using an oil bubbler. Then the layers were separated, and to the water layer was added 150 ml. of water. After cooling, the solid was filtered off and washed with 50 ml. of acetonitrile to yield 80–85 g. of the HCl salt. From the mother liquor a further crop of the product can be obtained by liberating the free base and repeating HCl treatment as above. The product was recrystallized as the hydrochloride from methanol-ether; m.p. 135° C. (dec.).

Anal. calc'd. for C₁₇H₂₃NO.HCl.CH₃OH: C, 66.34; H, 8.66; N, 4.29.
Found: C, 66.34; H, 8.02; N, 4.46.

DESCRIPTION OF THE PREFERRED EMBODIMENTS

Example 1

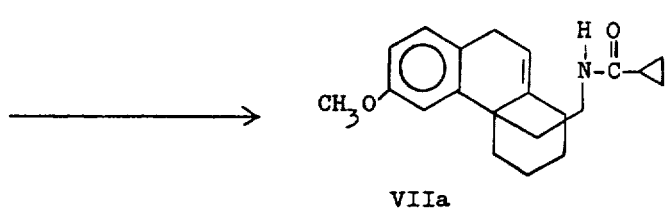

Va → VIIa

Found: C, 63.41; H, 7.43; N, 3.79.

Step D

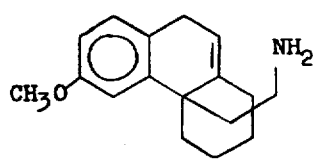

4α-(2-Aminoethyl)-1,2,3,4,4a,9-hedahydro-6-methoxyphenanthrene (Va)

To a cooled (ice bath) and stirred solution of 25.0 g. of Va and 11.0 g. of triethylamine in 100 ml. of CH₂Cl₂ was added dropwise a solution of 10.5 g. (0.1 mole) of cyclopropyl carbonyl chloride in 15 ml. CH₂Cl₂ during 15 minutes. The reaction mixture was treated with water and the layers separated The organic layer was dried (Na₂SO₄) and evaporated to dryness. The residual oil was treated with 30 ml. of ether and after standing for 2 hours at r.t. it crystallized. It was filtered to give 25.56 g. of white solid m.p. 120°–125° C. Recrystallization from methanol afforded analytical sample, m.p. 126°-130° C., of compound VIIa. The Infrared (IR) and Nuclear Magnetic Resonance (NMR) spectra were consistent with the structure.

Anal. calc'd. for $C_{21}H_{27}NO_2$: C, 77.50; H, 8.36; N, 4.30.

Found: C, 77.21; H, 8.40; N, 4.09.

Example 2

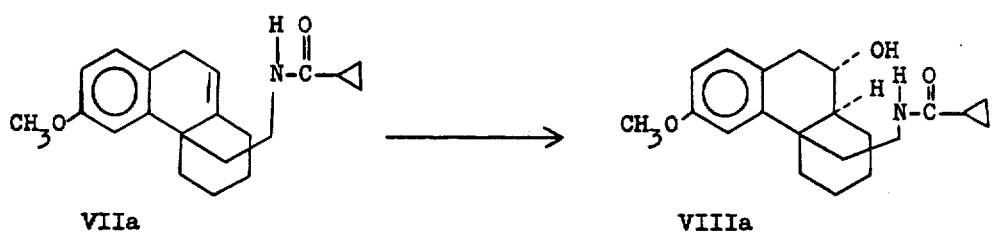

52 ml. of approximately 1M boron trihydride/tetrahydrofuran (THF) solution was added to a solution of 6.50 g. (20 m.mole) of VIIa in 25 ml. dry THF, and the resulting reaction mixture was let standing at r.t. for 4 hours. It was then decomposed with 1 ml. $H_2O$, 9 ml. 5N NaOH, and 2.9 ml. 30% $H_2O_2$. The reaction mixture was refluxed for 20 minutes, cooled, treated with water and acidified with concentrated HCl. The acidic solution was extracted with benzene, and the benzene solution was dried ($Na_2SO_4$) and evaporated to dryness to yield 4.22 g. of a neutral oil. The acidic solution was basified with $NH_4OH$, and extracted with $CH_2Cl_2$. The $CH_2Cl_2$ solution was dried and evaporated to dryness to yield 1.9 g. of basic oil.

The neutral oil contained a mixture of product VIIIa and an unknown side product. 2.2 g. of product VIIIa was obtained as a white crystalline solid (m.p. 117°) by treating the crude oil with ether and allowing it to stand at r.t. to crystallize. The analytical sample of VIIIa was recrystallized twice from $CH_2Cl_2$—ether, m.p. 130°-131° C. The IR and NMR spectra were consistent with the structure.

Anal. calc'd. for $C_{21}H_{29}NO_3$: C, 73.44; H, 8.51; N, 4.08.

Found: C, 73.40; H, 8.59; N, 4.07.

Example 3

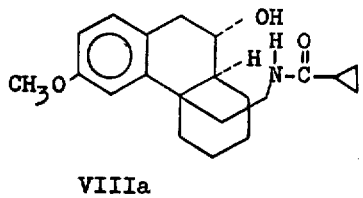

To a solution of 1.94 g. (5.648 m.mole) of VIIIa and 0.808 g. (8 m.mole) of triethylamine in 30 ml. dry benzene was added dropwise with cooling (ice bath) a solution of 8 ml. (8 m.mole) of a 1M mesyl chloride in benzene. The reaction mixture was left at r.t. for 3 hours. It was treated with water and the layers separated. The benzene solution was washed with dilute HCl and water. It was dried ($Na_2SO_4$) and evaporated to dryness to yield a solid residue. This was treated with ether and filtered to give 2.2 g. of IXa (m.p. 120°-122° C.). Analytical sample recrystallized from $CH_2Cl_2$—ether, m.p. 123°-124° C. The IR and NMR were consistent with the structure.

Anal. calc'd. for $C_{22}H_{31}NO_5S$: C, 62.68; H, 7.41; N, 3.32.

Found: C, 62.32; H, 7.39; N, 3.18.

Example 4

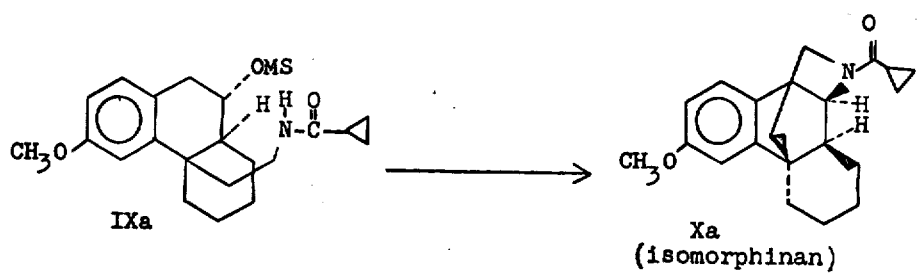

To a cooled (ice salt bath) and stirred suspension of 0.126 g. (5.25 m.mole) of NaH in 5 ml. dry DMF was added dropwise a solution 1.48 g. (3.5 m.mole) of IXa in 15 ml. dry DMF. The reaction mixture was stirred at r.t. for 18 hours. It was decomposed with water and extracted with benzene. The benzene extracts were dried and evaporated to dryness to give 1.2 g. of Xa. Analytical sample was distilled b.p. 165–170/0.01–0.05. The IR and NMR were consistent with the structure.

Anal. calc'd. for $C_{21}H_{27}NO_2$: C, 77.50; H, 8.37; N, 4.30.

Found: C, 77.56; H, 8.44; N, 4.15.

Example 5

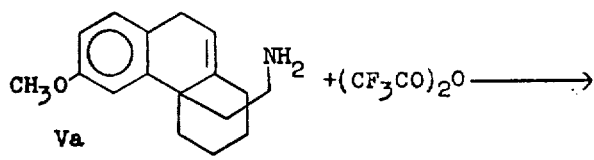 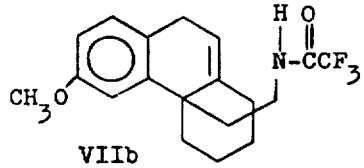

A solution of 46.2 g. (0.22 mole) of trifluoroacetic anhydride in 50 ml. of $CH_2Cl_2$ was added dropwise to a cooled (ice-bath) and stirred solution of 51.4 g. (0.2 mole) of Va and 22.22 g. (0.22 mole) of triethylamine in 150 ml. of $CH_2Cl_2$. The reaction mixture was decomposed with ice-water and the layers separated. The $CH_2Cl_2$ solution was washed with dilute HCl, water and then dried ($Na_2SO_4$). It was evaporated to dryness to yield a solid residue weight 67.0 g. This was dissolved in ether and diluted with a large amount of petroleum ether. After filtration, there was obtained 58.0 g. of solid VIIb, m.p. 99°–101° C. The IR and NMR were consistent with the structure.

Anal. calc'd. for $C_{19}H_{22}NO_2F_3$: C, 64.58; H, 6.27; N, 3.96.

was heated to an internal temperature of 45°–50° C. for 30 minutes. It was then cooled, treated with 100 ml. of cold $H_2O$ and acidified carefully with concentrated HCl. The reaction mixture was extracted with benzene. The benzene solution was dried ($Na_2SO_4$) and evaporated to give 11.7 g. of a crude product, primarily VIIIb.

600 mg. of crude VIIIb was chromatographed through a silica gel column (15 g.). Elution with a mixture of benzene ether (9:1) yielded 100 mg. of an unidentified by-product (Rf 0.71 silica, benzene:ether, 3:2). Further elution with benzene:ether, (1:1) afforded 430 mg. of the desired product (Rf 0.32 silica, benzene:ether, 3:2). The IR and NMR were consistent with the structure.

Anal. calc'd. for $C_{19}H_{24}NO_3F_3$: C, 61.44; H, 6.51; N, 3.77.

Found: C, 61.60; H, 6.74; N, 3.63.

The acidic aqueous solution was basified with $NH_4OH$ and extracted with $CH_2Cl_2$ to give 450 mg. of a basic oil whose structure was not investigated.

Example 7

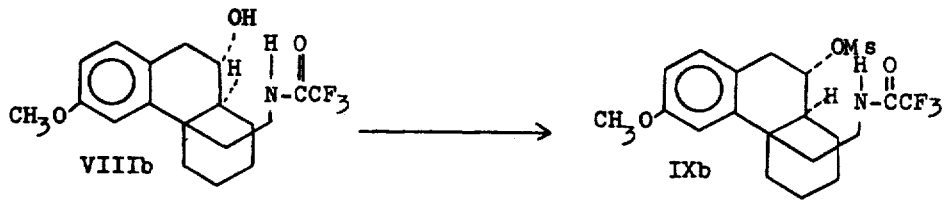

Found: C, 64.82; H, 6.25; N, 3.82.

Example 6

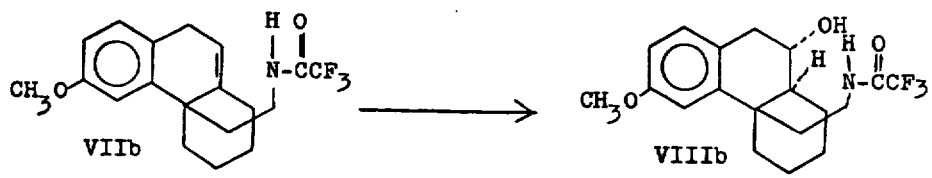

To a cooled (ice-bath) and magnetically stirred solution of 10.5 g. (30 m. mole) of VIIb in 80 ml. of dry THF was added dropwise 75 ml. (75 m. mole) of 1 M $BH_3$/THF solution. After addition, the reaction mixture was kept in a cold room for 18 hours and then at r.t. for 4 hours. It was treated carefully with 3 ml. $H_2O$, 16 ml. 5N NaOH, 4.4 ml. 30% $H_2O_2$, and the resulting mixture To a cooled (ice-bath) and stirred mixture of 11.2 g. (30.18 m. mole) of crude VIIIb and 4.51 g. (45 m. mole) of triethylamine in 50 ml. of dry benzene was added dropwise a solution of 5.16 g. (45 m. mole) of mesyl chloride in 10 ml. dry benzene. After addition, the reaction mixture was stirred in the cold for 30 minutes and at r.t. for 3 hours. It was then treated with 100 ml. of water. The layers were separated, and the aqueous layer extracted with $CH_2Cl_2$. The combined organic extracts were washed with dilute HCl followed by water. It was dried (Na₂SO₄) and evaporated to dryness to give a residue which was treated with a small amount of benzene and diluted with a large amount of ether. The resulting solid was collected by filtration; weight 5.54 g. (41%) of compound IXb, m.p. 115°–116° C. The IR and NMR spectra were consistent with the structure.

Anal. calc'd. for C₂₀H₂₈NO₅SF₃: C, 53.44; H, 5.83; N, 3.12.

Found: C, 52.81; H, 5.72; N, 3.16.

Example 8

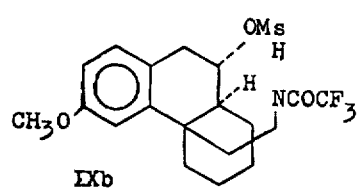
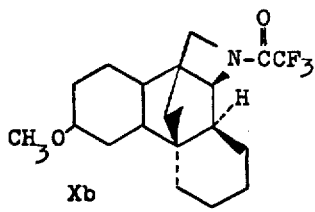
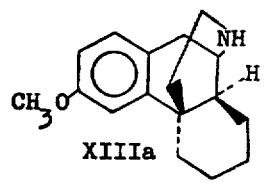

To a cooled (ice-bath) and stirred suspension of 0.324 g. (13.5 m.mole) of NaH in 5 ml. dry DMF was added dropwise a solution of 4.05 g. (9 m.mole) of IXb in 20 ml. dry DMF. The reaction mixture was stirred at r.t. for 6 hours and then it was cooled, decomposed with 10 ml. of water, and extracted with benzene. The benzene solution was dried (Na₂SO₄) and evaporated to give 3.55 g. of an oil. This was taken up in ether and extracted with dilute HCl. The ether solution was dried and evaporated to give 1.25 g. of neutral oil Xb. The acidic solution was basified with NH₄OH, and extracted with CH₂Cl₂. The CH₂Cl₂ solution was dried and evaporated to give 1.40 g. of basic oil XIIIa.

A sample of neutral oil Xb was distilled b.p. 140°–145° C./0.01–0.05 mm. The IR and NMR spectra of Xb were consistent with the structure.

The IR (HCl salt) and NMR (free base) spectra were consistent with the structure.

Anal. calc'd. for C₁₇H₂₃NO.HCl: C, 69.49; H, 8.23; N, 4.77.

Found: C, 69.48; H, 8.38; N, 4.62.

By varying the work up temperature, the ratio of products Xb and XIIIa can be adjusted. In another experiment 9.09 g. (20 m.moles) of Xb in 25 ml. dry THF reacted with 0.72 g. (30 m.mole) of NaH in 10 ml. dry DMF under the same condition as above. During the work up, the reaction mixture was well cooled with an ice-salt bath and then decomposed with ice water. This afforded 5.7 g. of neutral compound Xb and 1.1 g. of basic compound XIIIa.

The basic compound XIIIa can be obtained from the amide Xb by treatment with NaOH in aqueous ethanol. Thus 5.4 g. of Xb and 20 ml. of 1N sodium hydroxyde in 80% aqueous ethanol was refluxed for 15 minutes. The reaction mixture was cooled, diluted with water and extracted with ether. After drying and evaporation of the ether, there was obtained 4.0 g. of the basic compound XIIIa.

A simplified procedure consists in carrying out the above hydrolytic procedure to the mixture of Xb and XIIIa thus leading to a single product, namely the secondary amine XIIIa.

Example 9

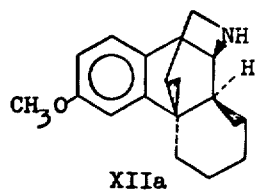
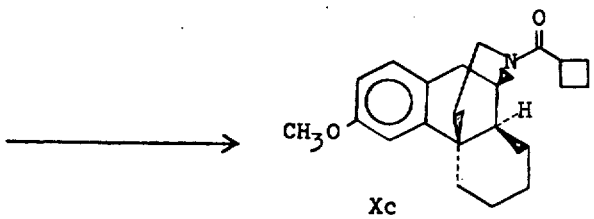

Anal. calc'd. for C₁₉H₂₂NO₂F₃: C, 64.58; H, 6.28; N, 3.96.

Found: C, 64.49; H, 6.34; N, 3.97.

The basic oil 1.4 g. was taken up in dry ether, filtered through celite-charcoal, and converted to its HCl salt in dry ether to give 1.42 g. of HCl salt of XIIIa. A sample was recrystallized from methanol-acetone and dried under high vacuum at 80° C., m.p. 293°–295° C. (d).

To a cooled (ice-bath) and stirred solution of 5.0 g. (19.45 m.mole) of XIIIa and 2.12 g. (21 m.mole) of triethylamine in 50 ml. CH₂Cl₂ was added dropwise a solution of 2.49 g. (21 m.mole) of cyclobutylcarbonyl chloride in 10 ml. CH₂Cl₂. After addition, the reaction mixture was treated with water and the layers separated. The CH₂Cl₂ layer was washed with dilute HCl and water. It was dried (Na₂SO₄) and evaporated to dryness to give 5.98 g. (90%) of an oil. A sample was distilled b.p. 165°–170° C./0.01–0.05 mm. (Xc). The IR and NMR spectra were consistent with the structure.

Anal. calc'd. for $C_{22}H_{29}NO_2$: C, 77.84; H, 8.61; N, 4.13.

Found: C, 77.55; H, 8.72; N, 4.01.

Example 10

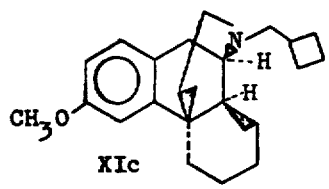

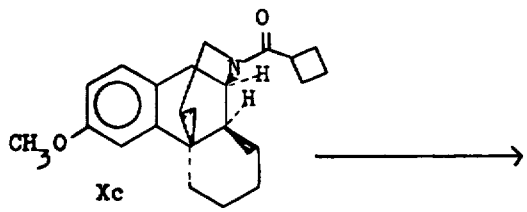

A solution of 5.67 g. (16.68 g.mole) of Xc in 40 ml. of dry THF was added dropwise to a suspension of 1.0 g. lithium aluminum hydride (LAH) in 10 ml. dry THF at r.t. The reaction mixture was refluxed for 4½ hours. There was then added, in succession, 1 ml. $H_2O$, 1 ml. 5N NaOH and 3 ml. $H_2O$. The reaction mixture was filtered and the cake washed well with ether. The organic filtrate was extracted with dilute HCl and water The combined acidic solution was basified and extracted with $CH_2Cl_2$. The $CH_2Cl_2$ solution was dried and evaporated to give 4.55 g. of basic XIc.

Example 11

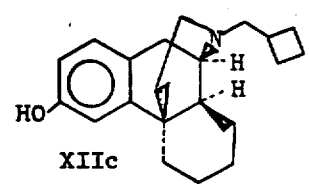

A solution of 4.25 g. (13.05 m.mole) of XIc in 130 ml. dry $CH_2Cl_2$ was added dropwise during 30 minutes to a cooled (ice-salt bath) and stirred solution of 6.77 g. (27 m.mole) of $BBr_3$ in 10 ml. dry $CH_2Cl_2$. After addition, it was stirred at r.t. for 30 minutes. The reaction mixture was decomposed with water, basified with $NH_4OH$ and the layers separated. The basic layer was extracted with $CH_2Cl_2$ and the combined $CH_2Cl_2$ solu-

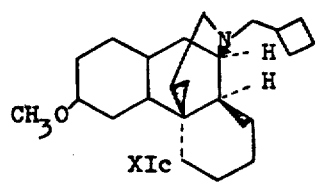

tion was dried and evaporated to dryness to give 4.0 g. of XIIc. This was converted to its HCl salt in acetone with 3 ml. concentrated HCl acid to give 4.0 g. of the salt. The salt was recrystallized twice from 90% ethanol to give 2.1 g. of XIIc, m.p. 263°–265° C. (d), as the HCl salt. The IR (HCl salt) and NMR spectra were consistent with the structure.

Anal. calc'd. for $C_{21}H_{29}NO·HCl$: C, 72.49; H, 8.69; N, 4.03.

Found: C, 72.27; H, 8.79; N, 4.08.

Example 12

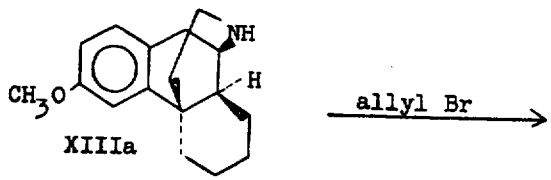

A sample was distilled b.p. 160°–165° C./0.01–0.05 mm. The IR and NMR spectra were consistent with the structure.

Anal. calc'd. for $C_{22}H_{31}NO$: C, 81.18; H, 9.60; N, 4.30.

Found: C, 81.30; H, 9.67; N, 4.18.

To a stirred solution of 900 mg. of the amine XIIIa and 1.7 g. of triethylamine in absolute ethanol (12 ml.) is added 0.605 g. of allyl bromide. The mixture is refluxed for 18 hours and evaporated to dryness. The residue is mixed with 20% aqueous sodium carbonate solution and the mixture extracted with several portions of ether. The ether extracts are washed with water, dried over $Na_2SO_4$ and evaporated to yield the product XId.

Example 13

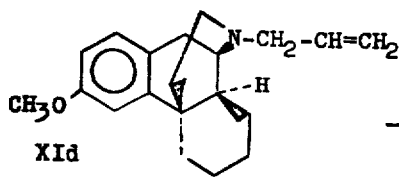

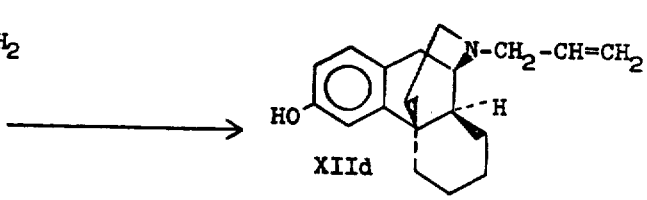

Substitution in the procedure of Example 11 for the XIc used therein of XId produces the product XIId.

B. Substitution in the procedure of Example 11 for the XIc used therein of XIf produces the product XIIf.

Example 14

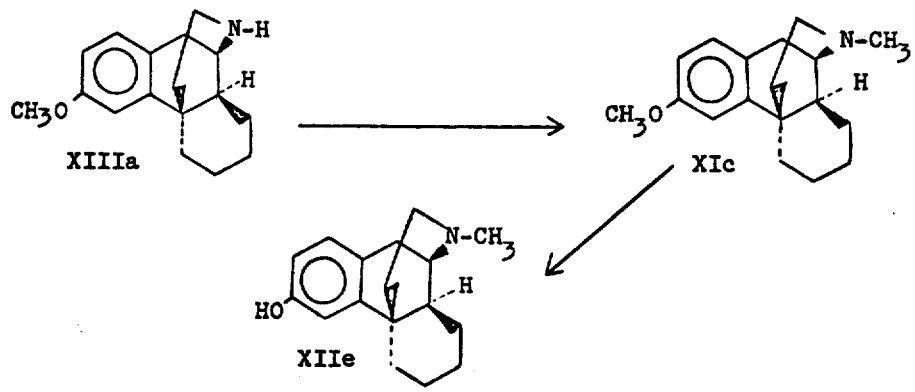

A. Substitution in the procedure of Example 12 for the allyl bromide used therein of methyl bromide produces the product XIe.

B. Substitution in the procedure of Example 11 for the XIc used therein of XIe produces the product XIIe.

Example 15

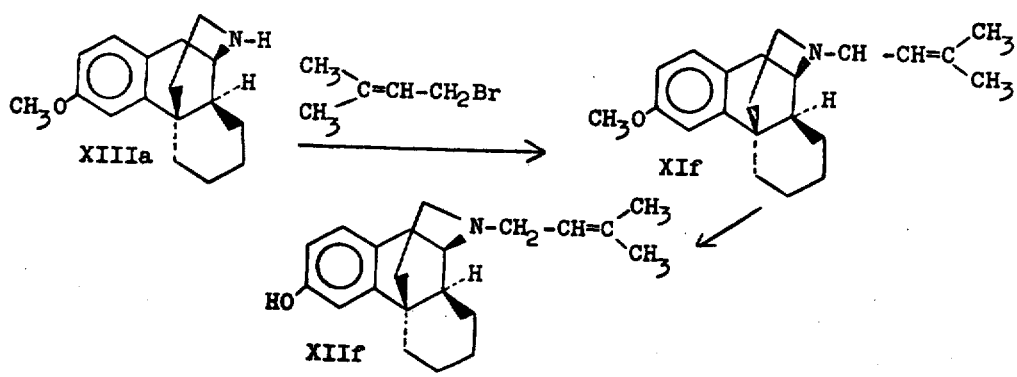

A. Substitution in the procedure of Example 12 for the allyl bromide used therein of 3,3-dimethylallyl bromide produces the product XIf.

Example 16

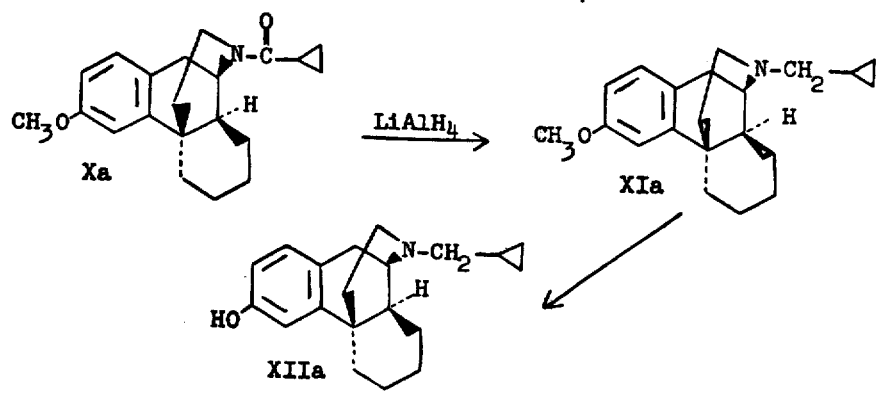

A. Substitution in the procedure of Example 10 for the compound Xc used therein of compound Xa produces the compound XIa.

B. Substitution in the procedure of Example 11 for the compound XIc used therein of compound XIa produces the compound XIIa.

Example 17

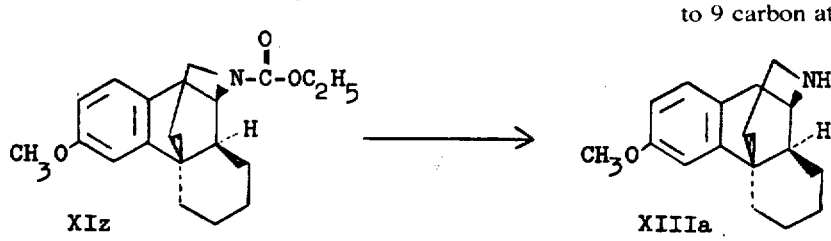

A mixture of XIz (0.1 mole), 160 ml. of n-octanol and 28.0 g. of KOH pellets is refluxed under nitrogen for 45 minutes. After cooling, the mixture is treated with water and ether (600 ml.). The water layer is discarded, and the organic layer is extracted with 300 ml. of 2N HCl and 2 × 300 ml. of water. The combined aqueous extracts are basified with aqueous ammonia and the free base is taken up in ether, to yield the product XIIIa after drying over $K_2CO_3$ and evaporation. The product is characterized by conversion to the oxalate salt in anhydrous ether which is recrystallized from an acetone-methanol mixture.

We claim:
1. The process of preparing compounds having the formula

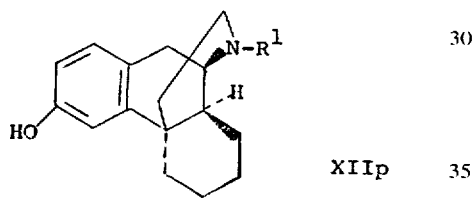

wherein $R^1$ is $C_2$–$C_9$ (lower)alkyl, —$(CH_2)_n$—$C_6H_5$,

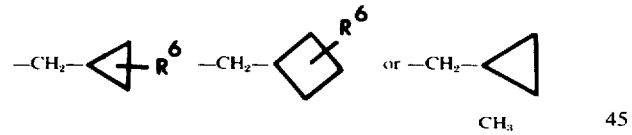

in which $R^6$ is H or $CH_3$ and $n$ is an integer of 1 to 3; which process comprises the consecutive steps of
A. acylating one mole of the compound having the formula

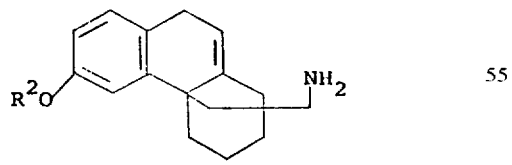

in which $R^2$ is (lower)alkyl of 1 to 10 carbon atoms, with at least one mole of an acylating agent having the formula

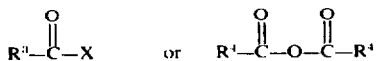

in which X is OH, Cl, Br or I, $R^4$ is (lower)alkyl of 1 to 9 carbon atoms, —$(CH_2)_n$—$C_6H_5$,

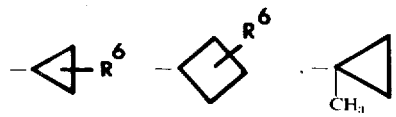

in which $R^6$ is H or $CH_3$ and $n$ is 0 or an integer of 1 or 2, in an inert organic solvent selected from the group consisting of methylene chloride, benzene, xylene, ether, dichloroethane and chloroform, in the presence of at least one mole or of a tertiary amine selected from the group consisting of triethylamine, trimethylamine, pyridine, N-methylpiperidine and N-methylpyrrolidine to produce the compound having the formula

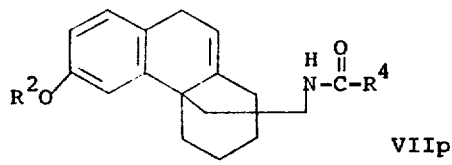

in which $R^4$ and $R^2$ are as above;
B. treating one mole of compound VIIp with at least one mole of boron trihydride, in an anhydrous organic solvent selected from the group consisting of dry tetrahydrofuran, benzene, dioxane, diethylether, diisopropylether and dibutylether, subsequently with at least one mole each of hydrogen peroxide and water in the presence of an alkali metal hydroxide to produce the compound having the formula

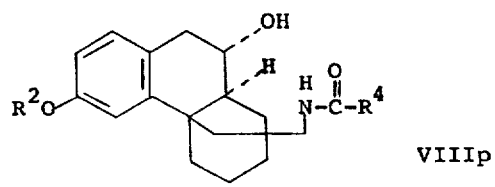

in which $R^2$ and $R^4$ are as above;
C. esterifying one mole of compound VIIIp with at least one mole of a (lower)alkyl of 1 to 10 carbon atoms, benzene or toluene sulfonyl halide, in which halide is chloro, bromo or iodo, in the presence of a least one mole of a tertiary amine selected from the group consisting of triethylamine, trimethylamine, pyridine, N-methylpiperidine and N-methylpyrrolidine in an inert organic solvent selected from the group consisting of benzene, xylene, toluene, methylenechloride and dichloroethane to produce the compound having the formula

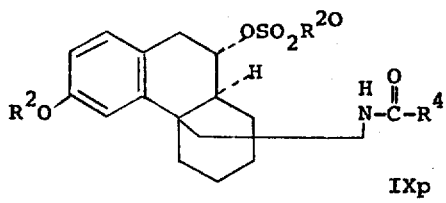

IXp in which $R^2$ and $R^4$ are as above and $R^{20}$ is (lower)alkyl of 1 to 10 carbon atoms, phenyl or tolyl;

D. cyclizing one mole of compound IXp by treatment with at least one mole of sodium hydride, in an inert organic solvent selected from the group consisting of benzene, dimethylformamide, dimethylacetamide, toluene, xylene, tetrahydrofuran and dioxane, to produce the compound having the formula

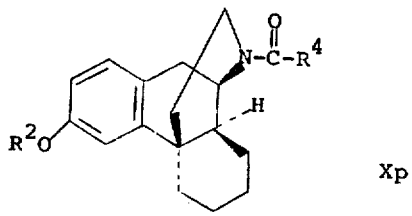

Xp in which $R^2$ and $R^4$ are as above;

E. reducing one mole of compound Xp with an excess of lithium aluminum hydride in an inert organic solvent selected from the group consisting of tetrahydrofuran, dioxane, diethylether, dipropylether and dibutylether with the aid of heat to produce the compound having the formula

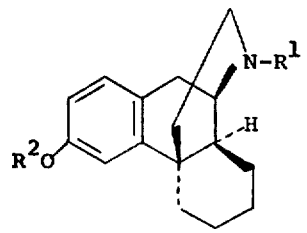

XIp in which $R^2$ and $R^1$ are as above; and

F. cleaving the ether function of compound XIp by treatment with at least an equimolar quantity of pyridine hydrochloride, boron tribromide or hydrobromic acid.

2. The process of claim 1 wherein in step A the mole of compound V is acylated with about 1 to about 1.5 moles of acylating agent, in an organic solvent selected from the group consisting of methylene chloride, benzene, xylene, ether, dichloroethane and chloroform, in the presence of at least one mole of a tertiary amine selected from the group consisting of triethylamine, trimethylamine, pyridine, N-methylpiperidine and N-methylpyrrolidine, to produce compound VIIp; in step B one mole of compound VIIp is treated with about 1.5 to about 4 moles of boron trihydride, in an anhydrous organic solvent selected from the group consisting of dry tetrahydrofuran, benzene, dioxane, diethyl ether, dipropylethyl and dibutyl ether, for about 2 to 24 hours, at a temperature in the range of about 0°C. to about 30°C., following which the mixture is treated with at least an equimolar quantity each of hydrogen peroxide, water and an alkali metal hydroxide with the aid of heat to produce the compound VIIIp with about 1.0 to 2.0 moles of a (lower)alkylsulfonyl chloride of 1 to 10 carbon atoms, in the presence of about 1.0 to 3.0 moles of a tertiary amine selected from the group consisting of triethylamine, trimethylamine, pyridine, N-methylpiperidine and N-methylpyrrolidine, in an organic solvent selected from the group consisting of benzene, xylene, toluene, methylene chloride and dichloroethane, to produce compound IXp; in step D cyclizing one mole of compound IXp by treatment with about 1.0 to about 2.0 moles of sodium hydride in an organic solvent selected from the group consisting of dimethylformamide, dimethylacetamide, benzene, toluene, xylene, tetrahydrofuran and dioxane at about room temperature for a period of about 5 to about 24 hours, to produce compound Xp; in step E reducing one mole of comcpound Xp with about 1.0 to about 2.0 moles of lithium aluminum hydride in an organic solvent selected from the group consisting of tetrahydrofuran, dioxane, diethylether, dipropylether and dibutylether, with the aid of heat, to produce compound XIp; and in step F cleaving the ether function of one mole of compound XIp by treatment with an agent selected from the group consisting of hydrobromic acid, boron tribomide and pyridine hydrochloride to produce compound XIIp.

3. The process of claim 2 wherein in step A one mole of compound V, in which $R^2$ is methyl, is acylated with about 1.0 to about 1.2 moles of acylating agent having the formula

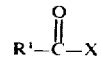

in which X is Cl, Br or I and $R^1$ is (lower)alkyl of 1 to 10 carbon atoms, $-(CH_2)_n-C_6H_5$,

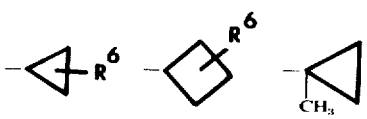

in which $R^6$ is H or $CH_3$ and n is 0 or an integer of 1 or 2, in methylene chloride, or dichloroethane, in the presence of about 1 to about 2 moles of triethylamine or pyridine to produce compound VIIp; in step B treating one mole of compound VIIp with about 2 to about 3 moles of boron trihydride in tetrahydrofuran or dioxane, and 1 to 2 moles each of hydrogen peroxide, water and sodium or potassium hydroxide with the aid of heat to produce compound VIIIp; in step C esterifying one mole of compound VIIIp with about 1.1 to about 1.6 moles of methylsulfonyl chloride, in the presence of about 1.1 to about 1.6 moles of triethylamine or pyridine in benzene, toluene or xylene to produce compound IXp; in step D cyclizing one mole of compound IXp with about 1.3 to 1.7 moles of sodium hydride in dimethylformamide or dimethylacetamide to produce compound Xp; in step E reducing one mole of compound Xp with about 1.0 to about 1.5 moles of lithium aluminum hydride in anhydrous tetrahydrofuran or dioxane at about reflux temperatures to produce compound XIp; and in step F cleaving the ether function of XIp by treatment with about 1.5 to about 4.0 moles of boron tribromide, hydrobromic acid or pyridine hydrochloride in methylene chloride to produce compound XIIp.

4. The process of claim 2 for the preparation of compound XIIp in which $R^1$ is

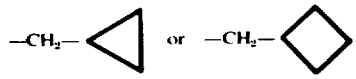

wherein in step A one mole of compound V, in which $R^2$ is methyl is acylated with about 1.0 to about 1.2 moles of cyclobutylcarbonyl chloride or cyclopropylcarbonyl chloride in methylene chloride, in the presence of 1.0 to 1.3 moles of triethylamine to produce compound VIIp; in step B treating one mole of compound VIIp with about 2 to 3 moles of boron trihydride in tetrahydrofuran, followed by 1.0 to 1.3 moles each of hydrogen peroxide, water and sodium hydroxide with the aid of heat to produce compound VIIIp; in step C esterifying one mole of compound VIIIp with about 1.1 to 1.3 moles of methylsulfonyl chloride, in the presence of 1.1 to 1.3 moles of triethylamine in anhydrous benzene to produce compound IXp; in step D cyclizing one mole of compound IXp with about 1.4 to 1.6 moles of sodium hydride in dimethylformamide to produce compound Xp; in step E reducing one mole of compound xp with about 1.0 to 1.5 moles of lithium aluminum hydride in anhydrous tetrahydrofuran to produce compound XI; and in step F cleaving the ether function of XIp by treatment with about 1.5 to 4.0 moles of boron tribromide, hydrobromic acid or pyridine hydrochloride in methylene chloride to produce compound XIIp.

\* \* \* \* \*